(12) United States Patent
Balthaser et al.

(10) Patent No.: US 11,140,212 B2
(45) Date of Patent: Oct. 5, 2021

(54) MONITORING AND REPORTING USAGE OF STANDALONE E-DISCOVERY MACHINE

(71) Applicant: KLDiscovery Ontrack, LLC, Eden Prairie, MN (US)

(72) Inventors: Daniel Balthaser, Harleysville, PA (US); Shane Levengood, Austin, TX (US)

(73) Assignee: KLDiscovery Ontrack, LLC, Eden Prairie, MN (US)

( * ) Notice: Subject to any disclaimer, the term of this patent is extended or adjusted under 35 U.S.C. 154(b) by 0 days.

(21) Appl. No.: 16/662,389

(22) Filed: Oct. 24, 2019

(65) Prior Publication Data
US 2020/0244749 A1 Jul. 30, 2020

Related U.S. Application Data

(60) Provisional application No. 62/796,444, filed on Jan. 24, 2019.

(51) Int. Cl.
| | |
|---|---|
| *H04L 29/08* | (2006.01) |
| *H04L 29/06* | (2006.01) |
| *G06F 9/455* | (2018.01) |
| *H04L 12/46* | (2006.01) |
| *H04L 12/24* | (2006.01) |
| *H04L 29/12* | (2006.01) |

(52) U.S. Cl.
CPC ........ *H04L 67/025* (2013.01); *G06F 9/45558* (2013.01); *H04L 12/4641* (2013.01); *H04L 41/0886* (2013.01); *H04L 61/2015* (2013.01); *H04L 63/029* (2013.01); *H04L 67/22* (2013.01); *G06F 2009/45595* (2013.01)

(58) Field of Classification Search
CPC ... H04L 67/22; H04L 67/025; H04L 12/4641; G06F 9/45558; G06F 2009/45595
See application file for complete search history.

(56) References Cited

U.S. PATENT DOCUMENTS

| | | | |
|---|---|---|---|
| 6,725,370 B1 * | 4/2004 | Sakakura | H04L 63/0428 713/155 |
| 8,112,406 B2 | 2/2012 | Paknad | |
| 8,200,635 B2 * | 6/2012 | Mayer | G06Q 10/10 707/641 |
| 8,549,327 B2 * | 10/2013 | Mayer | G06Q 10/06 713/193 |
| 8,868,561 B2 | 10/2014 | Richards | |
| 8,984,479 B2 | 3/2015 | Schmidt | |

(Continued)

*Primary Examiner* — S M A Rahman
(74) *Attorney, Agent, or Firm* — Finnegan, Henderson, Farabow, Garrett & Dunner, LLP

(57) ABSTRACT

Disclosed embodiments relate to systems and methods for tracking usage of a standalone e-discovery machine. Aspects include observing usage activity of at least one user of the standalone e-discovery machine; analyzing the usage activity of the at least one user in terms of at least one parameter, wherein the at least one parameter comprises of at least one of: size of data processed, number of users using the e-discovery machine, health metrics, or activities performed; determining usage data for the at least one user based on observing and analyzing; packaging the usage data into a transferrable format for secure communication to an external server; and reporting the usage data over a secure network connection from a host network to the external server.

18 Claims, 10 Drawing Sheets

(56) References Cited

U.S. PATENT DOCUMENTS

| | | |
|---|---|---|
| 10,122,747 B2 * | 11/2018 | Mahaffey ............ H04L 12/4641 |
| 10,754,678 B2 | 8/2020 | Govardhan |
| 2008/0098472 A1 | 4/2008 | Enomoto |
| 2009/0064279 A1 | 3/2009 | Ardolino |
| 2013/0117218 A1 | 5/2013 | Fan |
| 2014/0059226 A1 | 2/2014 | Messerli |
| 2014/0222780 A1 | 8/2014 | Wu |
| 2015/0200928 A1 | 7/2015 | Burch |
| 2016/0378718 A1 * | 12/2016 | Jarroush ............... G06F 3/0482 715/229 |
| 2017/0068682 A1 | 3/2017 | Crews |
| 2018/0152320 A1 | 5/2018 | Meyer |
| 2019/0179805 A1 * | 6/2019 | Prahlad ............... G06F 16/1827 |
| 2019/0222560 A1 | 7/2019 | Ford |
| 2019/0268381 A1 | 8/2019 | Narayanaswamy |
| 2019/0347440 A1 | 11/2019 | Langley |

\* cited by examiner

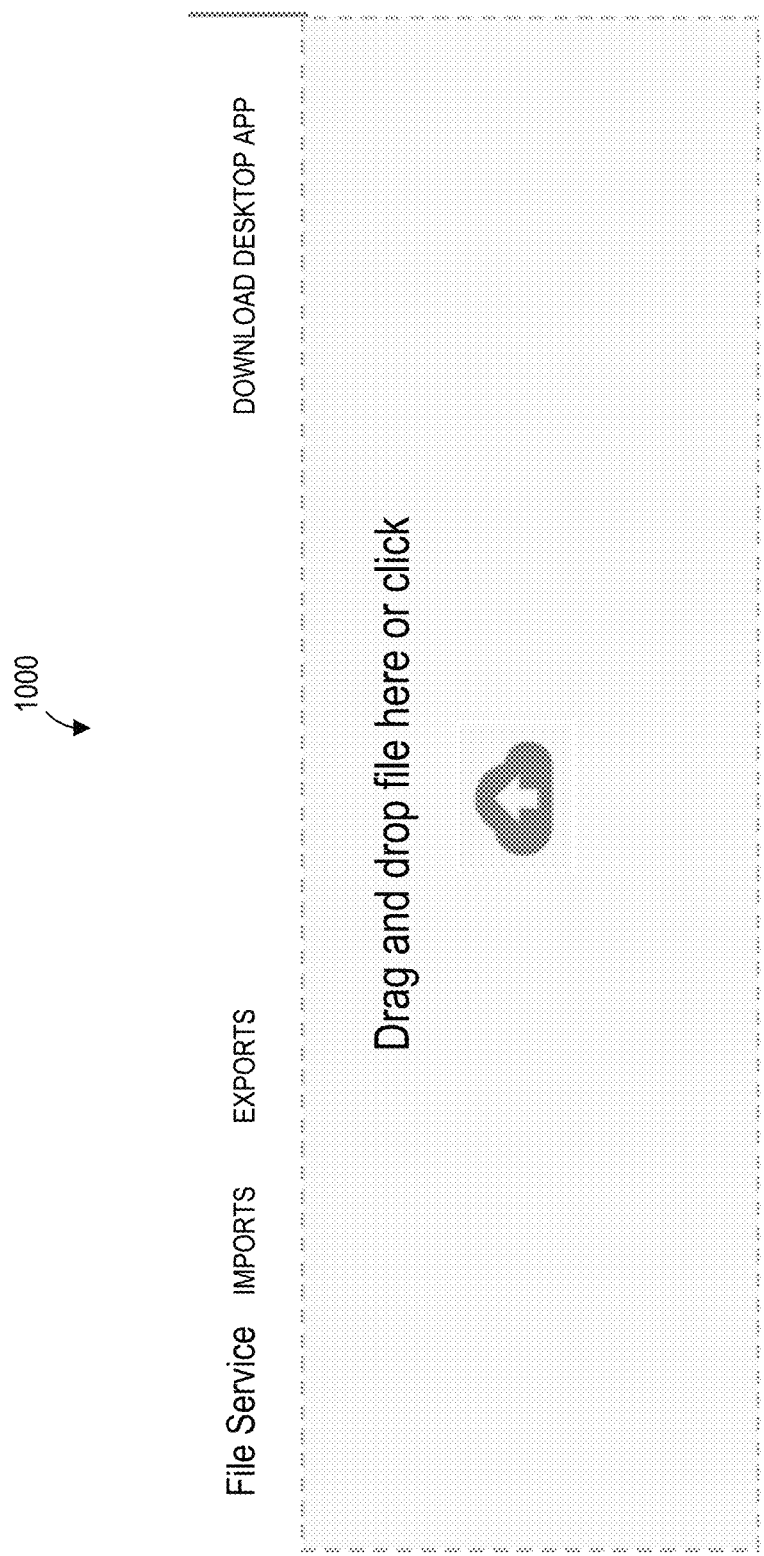

MONITORING AND REPORTING USAGE OF STANDALONE E-DISCOVERY MACHINE

CROSS-REFERENCE TO RELATED APPLICATION

This application claims priority to U.S. Application No. 62/796,444, filed on Jan. 24, 2019, the entirety of which is hereby incorporated by reference.

BACKGROUND

Given the increasing need to protect sensitive documents and data (e.g., confidential, proprietary, medical, litigation-related, etc.) from being mishandled, hacked, or released into the hands of unauthorized parties, solutions are needed to securely maintain and manage such documents and data. For example, as part of e-discovery activities, corporate document retention practices, clinical trial work, or other document management tasks, companies and other entities may have a need to ensure that their documents are not at risk of being leaked, stolen, corrupted, or otherwise compromised.

Many companies, law firms, and other enterprises engage e-discovery vendors to satisfy their document and data retention, processing, and production needs (e.g., as part of regular operations, during a litigation, during an investigation, etc.). Typically, documents and data are hosted on a storage service system (e.g., on-premises or cloud-based) to which the vendors may have access when performing administrative tasks or support services. Nevertheless, these approaches are limited by inefficiency, a lack of security, and a lack of functionality. For example, when documents or data are stored external to an enterprise at a vendor site, inefficiencies and latencies arise whenever documents or data are transmitted to or from the vendor's site. Further, additional inefficiencies and latencies arise when document processing tasks (e.g., analytics, harmonization, redactions, privilege review, etc.) are performed at the vendor's site. In addition to these drawbacks in terms of usability and performance, current approaches also give rise to security vulnerabilities. Whenever sensitive documents are transmitted across a network to a vendor's site, they are potentially exposed to attacks (e.g., man-in-the-middle attacks, etc.).

With cybersecurity threats getting more advanced and legal requirements for companies to safeguard data and documents growing, there is a need to further protect and provide secure access to sensitive documents and data. Specifically, there is a need to provide e-discovery services (e.g., document or data analytics, processing, production, technical support, etc.) in a manner where an enterprise can locally store documents or data and maximize protections by limiting the ability of external sources to access such documents or data.

Accordingly, in view of these and other deficiencies in existing techniques, technological solutions are needed for standalone document management and processing (e.g., e-discovery) machines in which data, documents, and programs can be securely controlled to minimize the chance of a security breach or leak. Solutions should advantageously allow for enterprises to perform document archiving and processing tasks efficiently and effectively in-house, and minimize the need for documents, data, and processing tasks to be transmitted to external networks. Further, techniques should also advantageously allow for technical support to be provided remotely to the standalone document management machine.

SUMMARY

The disclosed embodiments describe systems and methods for tracking usage of a standalone e-discovery machine. For example, in an exemplary embodiment, there may be a computer-implemented method for tracking usage of a standalone e-discovery machine comprising: observing usage activity of at least one user of the standalone e-discovery machine; analyzing the usage activity of the at least one user in terms of at least one parameter, wherein the at least one parameter comprises of at least one of: size of data processed, number of users using the e-discovery machine, health metrics, or activities performed; determining usage data for the at least one user based on observing and analyzing; packaging the usage data into a transferrable format for secure communication to an external server; and reporting the usage data over a secure network connection from a host network to the external server.

According to a disclosed embodiment, observing usage of at least one user comprises observing the at least one user's usage of e-discovery software stored on the e-discovery machine.

According to a disclosed embodiment, tracking usage of a standalone e-discovery machine occurs in real-time.

According to a disclosed embodiment, packaging the usage data into the transferrable format comprises packaging the usage data into at least one of: a raw text file, an HTML file, or a data object.

According to a disclosed embodiment, reporting the usage data comprises not changing network firewall settings of a local network to which the e-discovery machine is connected.

According to a disclosed embodiment, reporting the usage data comprises not changing port configurations of a local network to which the e-discovery machine is connected.

According to a disclosed embodiment, reporting the usage data comprises not changing network firewall or port configurations of a local network to which the e-discovery machine is connected.

According to a disclosed embodiment, the standalone e-discovery machine is integrated into a local network that at least one computer of the at least one user is remotely connected to, wherein the integration into the local network comprises the e-discovery machine being physically connected to the local network.

According to a disclosed embodiment, the standalone e-discovery machine is integrated into a local network that at least one computer of the at least one user is remotely connected to, wherein the integration into the local network comprises the e-discovery machine being wirelessly connected to the local network.

According to another disclosed embodiment, a standalone e-discovery apparatus may comprise a processor configured to execute software instructions; and a memory storing the software instructions. The processor may be configured to execute the software instructions to perform operations comprising: observing usage activity of at least one user of the standalone e-discovery machine; analyzing the usage activity of the at least one user in terms of at least one parameter, wherein the at least one parameter comprises of at least one of: size of data processed, number of users using the e-discovery machine, health metrics, or activities performed; determining usage data for the at least one user based on observing and analyzing; packaging the usage data into a transferrable format for secure communication to an external server; and reporting the usage data over a secure network connection from a host network to the external server.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 10 is a diagram depicting an exemplary interface for a user to import or export data or documents in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

Figure 1:
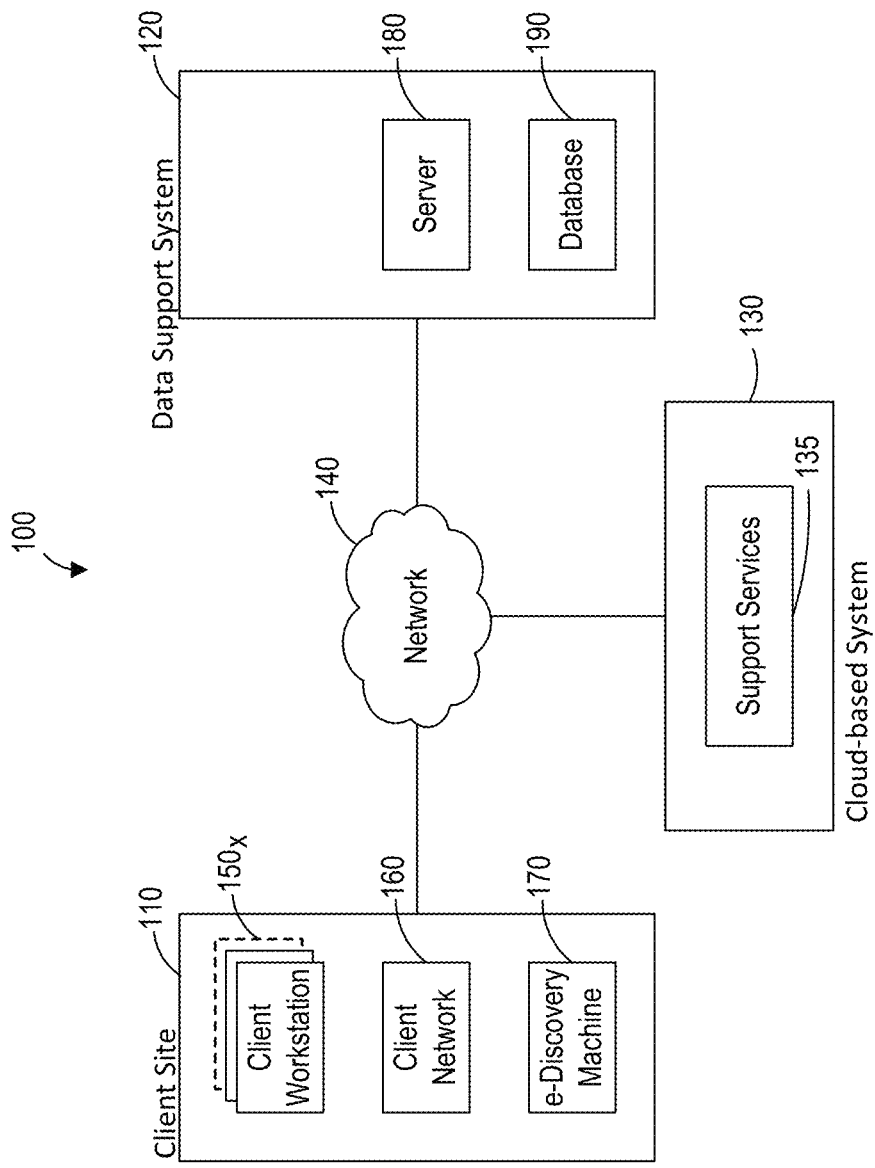
FIG. 1 is a block diagram of an exemplary system for initiating an external connection from a standalone e-discovery device in accordance with disclosed embodiments.

FIG. 1 illustrates an exemplary system 100 for initiating an external connection from a standalone e-discovery device. System 100 may include a client site 110, data support system 120, and a cloud-based system 130, as shown in FIG. 1. The client site 110 may include a variety of inter-connected devices on a private network (e.g., company network, law firm network, university network, etc.). For example, client site 110 may include one or more client workstations $150_x$ (e.g., if there were four client workstations, then the client site 110 would have client workstations $150_1$, $150_2$, $150_3$, $150_4$). A client workstation $150_x$ may include a variety of different types of computing devices capable of communicating over a network, such as network 150 and/or network 140. For example, client workstation $150_x$ may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Client workstation $150_x$ may further be a handheld device (e.g., a mobile phone, a tablet, or a notebook), a wearable device (e.g., a smart watch, smart jewelry, an implantable device, a fitness tracker, smart clothing, a head-mounted display, etc.), or various other devices capable of processing and/or receiving data.

Client workstation $150_x$ may be in communication with a standalone e-discovery machine 170, as shown in FIG. 1. In some embodiments, client workstation $150_x$ may communicate with standalone e-discovery machine 170 directly through a physical connection (e.g., Ethernet or CAT-5 connection, USB connection, etc.). Alternatively, or in addition, client workstation $150_x$ may communicate with standalone e-discovery machine 170 over private client network 160. Such communications may take place across various types of networks, such as the Internet, a wired Wide Area Network (WAN), a wired Local Area Network (LAN), a wireless WAN (e.g., WiMAX), a wireless LAN (e.g, IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. Communication and data transferred over private client network 160 may, in some embodiments, take place securely behind a client firewall that shields client site 110 from external networks (e.g., network 140).

E-discovery machine 170 may be a device capable of allowing a user to perform numerous e-discovery related-tasks (e.g., document or data storage, archiving, processing, review, redacting, producing, etc.) through, for example, e-discovery software integrated into the e-discovery machine 170. While e-discovery machine 170 may be used to manage documents in a litigation context, it also may have other uses. For example, e-discovery machine 170 may be used for other document management and processing needs in which data, documents, and programs can be securely controlled to minimize the chance of a security breach or leak. The advantages of e-discovery 170—which include performing document archiving and processing tasks efficiently and effectively in a localized and controlled environment, minimizing the need for documents, data, and processing tasks to be transmitted to external networks, and allowing for technical support to be provided remotely to the e-discovery 170—can be applied to various other contexts outside of litigation (e.g., data warehousing, data forensics, data backup, limitations on access to data, etc.). The term e-discovery machine is thus intended to broadly encompass these and other uses. The e-discovery machine 170 may be situated locally on-site (e.g., within client site 110) or in a remote location based on an enterprise's needs. The e-discovery machine 170 may in some embodiments function on the client network 160 behind a client site 110's firewall. Further detail regarding the e-discovery machine 170 is provided below with reference to FIG. 2.

The client site 110 may be connected to a network 140 to communicate with other systems such as, for example, a cloud-based system 130 and/or a data support system 120, among other potential systems. Network 140 may be a variety of types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, etc.

Cloud-based system 130 may in some embodiments help facilitate the client site 110 to initiate an external connection from a standalone e-discovery device 170. Cloud-based system 130 may be, for example, a cloud computing service, such as a Software as a Service (SaaS) system, a Platform as a Service (PaaS), or Infrastructure as a Service (IaaS) system. In such embodiments, cloud-based system 130 may be based on infrastructure of service providers such as Amazon Web Services™ (AWS), Microsoft Azure™, Google Cloud Platform™ Cisco Metapod™, JoyentTM, vmWare™ or other cloud computing providers. As described further below in connection with FIG. 3, the cloud-based system 130 may include support software for the standalone e-discovery machine 170. For example, the support software may allow for establishing network connections to endpoints and help create connections to facilitate remote support services (e.g., from data support system 120) through the use of the support services software 135. For example, the standalone e-discovery machine 170 may interact with the support services software 135 to create or access an application programming interface such as, but not limited to, a support ticket or other unique identifiers that help identify a support request from e-discovery device 170. The request may comprise, for example, an HTTP request, LDAP request, other type of network request, or the like. Creating a support ticket may comprise using the cloud-based system to provision one or more support virtual machines (e.g., virtual machine instances, Docker™ container instances, etc.). Support virtual machines may be provisioned (e.g., dynamically spun up or instantiated) to handle specific remote support requests from e-discovery devices 170.

Provisioning one or more virtual machines may in some embodiments comprise using application programming interfaces of the cloud-based system 130. In some embodiments, the standalone e-discovery machine 170 may not request creation of a support ticket. In other embodiments the standalone e-discovery machine 170 directly connects to the support services software 135 provided by the cloud-based system 130. The standalone e-discovery machine 170 may request information regarding the provisioned one or more support virtual machines. This may be accomplished by the standalone e-discovery machine 170 polling the support services software 135 in the cloud-based system 130. For example, this may include the standalone e-discovery machine 170 requesting a status update from the support services software 135 that may include information regarding the support virtual machines. During (or associated with) the request from the standalone e-discovery machine 170, the support virtual machines may be dynamically provisioned, or may be already spun up and available.

After the one or more support virtual machines are provisioned, the standalone e-discovery machine 170 may receive an IP address, port number, and/or other network address identifier of the one or more support virtual machines. The support virtual machines may, as discussed further below, act as an SSH server after being provisioned. The IP address of the virtual machine may be sent from the support services software 135 of the cloud-based system 130 to the standalone e-discovery machine 170. The standalone e-discovery machine 170 may also receive other information or data such as, but not limited to, port configuration information. For example, the cloud-based system 130 may relay to the standalone e-discovery machine 170 the specific port that an SSH server is listening on. The SSH server may be part of the cloud-based system, for example, as explained below in connection with FIG. 3.

Data support system 120 may be hosted on a network on an external site. For example, data support system 120 may be maintained by a document management, archiving, or processing company that provides support for e-discovery machines 170. As discussed further below, data support system 120 may connect to the private client network 160 and the standalone e-discovery machine 170 through the initiation of an external connection based on the processes of the client site 110 and cloud-based system 130. The data support system 120 includes server 180, database 190, and potentially other external network devices. The data support system 120 may allow users of data support system 120 access to the e-discovery machine 170 to provide direct support, such as support for e-discovery tasks (e.g., document or data storage, archiving, processing, culling, review, etc.). The data support system 120 may in some embodiments be permitted access to the private client network 160 and the standalone e-discovery machine 170 by approval from a user at the client site 110. Approval may, for example, be based on a user at the client site 110 initiating a request by the standalone e-discovery machine 170 to request support services to the cloud-based system 130.

Figure 2:
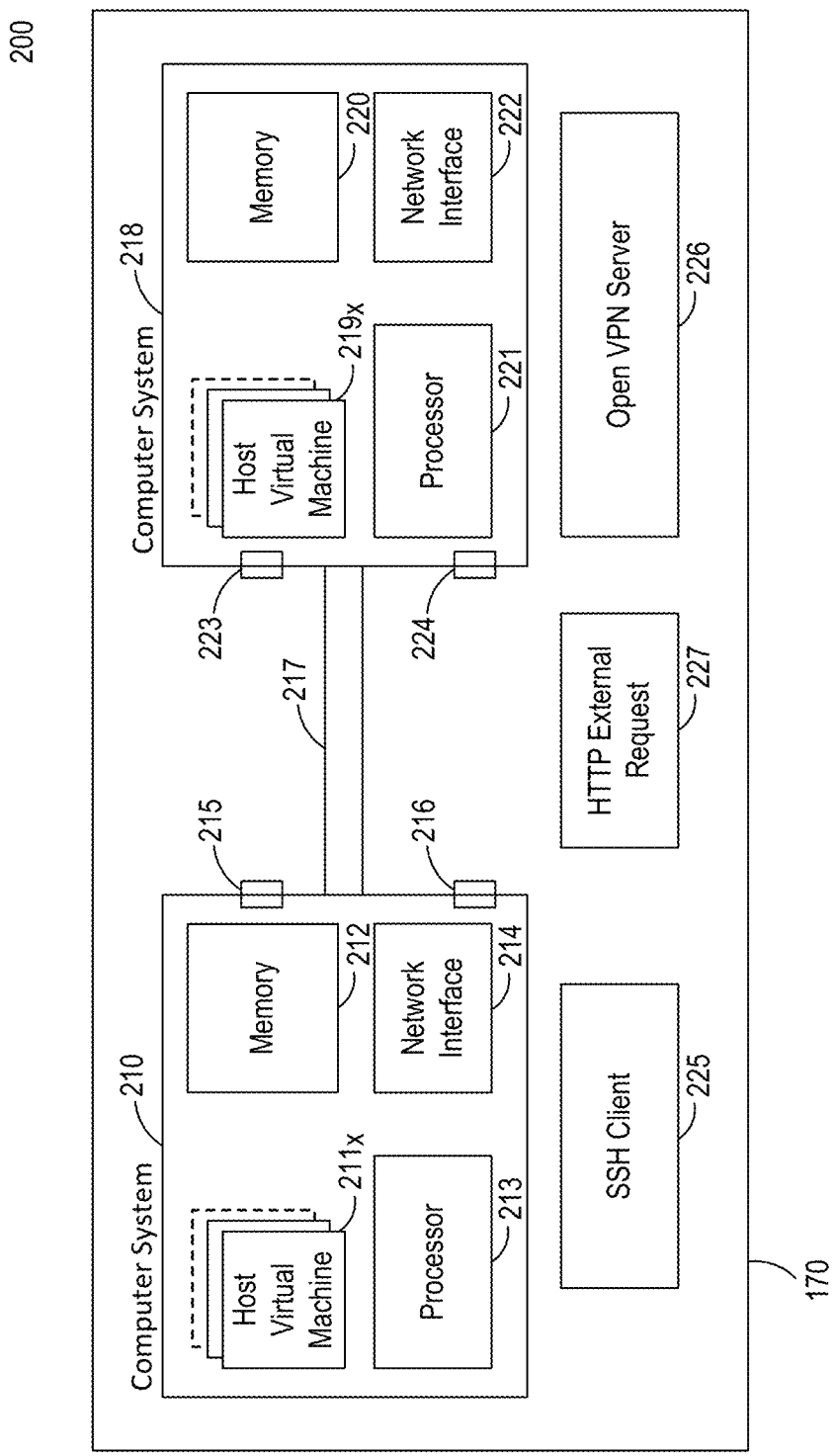
FIG. 2 is a block diagram showing components of an exemplary standalone e-discovery device in accordance with disclosed embodiments.

FIG. 2 is a block diagram 200 showing an exemplary standalone e-discovery machine 170 in accordance with disclosed embodiments. As noted above, the standalone e-discovery machine 170 may be used in various other document management and processing contexts beyond litigation. As illustrated, standalone e-discovery machine 170 may include one or more computer systems, for example, computer systems 210 and 218. Computer systems 210 and 218 are shown in FIG. 2 to have the same components but the designs can be configurable and different based on the requirements and needs of the users utilizing the standalone e-discovery machine 170. Furthermore, other components of the standalone e-discovery machine 170 may be configurable and changed based on the based on the requirements and needs of the users utilizing the standalone e-discovery machine 170.

Computer systems 210 and 218 may include one or more processors 213 and 221, one or more memories 212 and 220, one or more input/output (I/O) devices 215, 216, 223, 224, one or more network interfaces 214 and 222, and one or more host virtual machines 211$_x$ and 219$_x$. The one or more computer systems may be connected by an internal private network 217, by a computer bus, or by other techniques. While FIG. 2 depicts two computer systems 210 and 218 housed within the standalone e-discovery machine 170, in other embodiments only one computer system, or more than two, may be included in standalone e-discovery machine 170.

Processor (or processors) 213 and 221 may include one or more data or software processing devices. For example, the processors 213 and 221 may take the form of, but are not limited to, a microprocessor, embedded processor, or the like, or may be integrated in a system on a chip (SoC). Furthermore, according to some embodiments, the processors 213 and 221 may be from the family of processors manufactured by Intel®, AMD®, Qualcomm®, Apple®, NVIDIA®, or the like. The processors 213 and 221 may also be based on the ARM architecture, a mobile processor, or a graphics processing unit, etc. The disclosed embodiments are not limited to any type of processor configured in the computer systems 210 and 218.

Memory (or memories) 212 and 220 may include one or more storage devices configured to store instructions used by the processors 213 and 221 to perform functions related to the disclosed embodiments. Memories 212 and 220 may be configured to store software instructions, such as programs, that perform one or more operations when executed by the processors 213 and 221 to securely obtain data from the cloud-based system 130 or data support system 120, to initiate secure connections to cloud-based system 130 or data support system 120, or to perform other functionality as discussed below.

The disclosed embodiments are not limited to particular software programs or devices configured to perform dedicated tasks. For example, the memories 212 and 220 may store a single program, such as a user-level application, that performs the functions of the disclosed embodiments, or may comprise multiple software programs. Additionally, the processors 213 and 221 may in some embodiments execute one or more programs (or portions thereof) remotely located from the computer systems 210 and 218. Furthermore, the memories 212 and 220 may include one or more storage devices configured to store data for use by the programs.

Input/output devices 215, 216, 223, 224 may include one or more integrated ports or stand-alone devices configured to allow data to be received and/or transferred by and between the computer systems 210 and 218. The I/O devices 215, 216, 223, 224 may include one or more network adaptors or communication devices and/or interfaces (e.g., Ethernet, CAT-5, WiFi, Bluetooth®, RFID, NFC, RF, infrared, etc.) to communicate with other machines and devices, such as with other components of system 200 through internal private network 217. In some embodiments, the I/O devices 215, 216, 223, 224 may comprise a touchscreen configured to allow a user to interact with the computer systems 210 and 218, and in some embodiments, the I/O devices 215, 216, 223, 224 may comprise a keyboard, mouse, trackball, touch pad, stylus, and the like. In embodiments where computer systems 210 and 218 are part of a terminal-based computer system, the I/O devices 215, 216, 223, 224 for interacting with the device may be limited, for example to a display, a keyboard and/or a printer.

The standalone e-discovery machine 170 may also include an SSH client 225, HTTP external request component 227, and an Open VPN server 226. The HTTP external request component 227 may include software to enable a user at the client site 110 to initiate a request for remote support services. The SSH client 225 (e.g., SSH client software based on OpenSSH, PuTTY, SSH Secure Shell Client, ConnectBot, or various others) may provide a connection endpoint for an SSH server, as discussed further below. For example, a provisioned support virtual machine may attempt to make a connection to the client site 110's private client network 160 and standalone e-discovery machine 170 by connecting to SSH client 225. The Open VPN server 226 may allow the standalone e-discovery machine 170 to connect to a support team member to receive remote services.

The standalone e-discovery machine 170 may be integrated with pre-installed software to function at client site 110 including, but not limited to, e-discovery software and remote support services software. The software supported by the standalone e-discovery machine 170 helps a user at the client site perform various functions including, but not limited to, e-discovery related tasks such as document and data storage, archiving, tagging, filtering, processing, redacting, culling, producing, etc.

Figure 3:
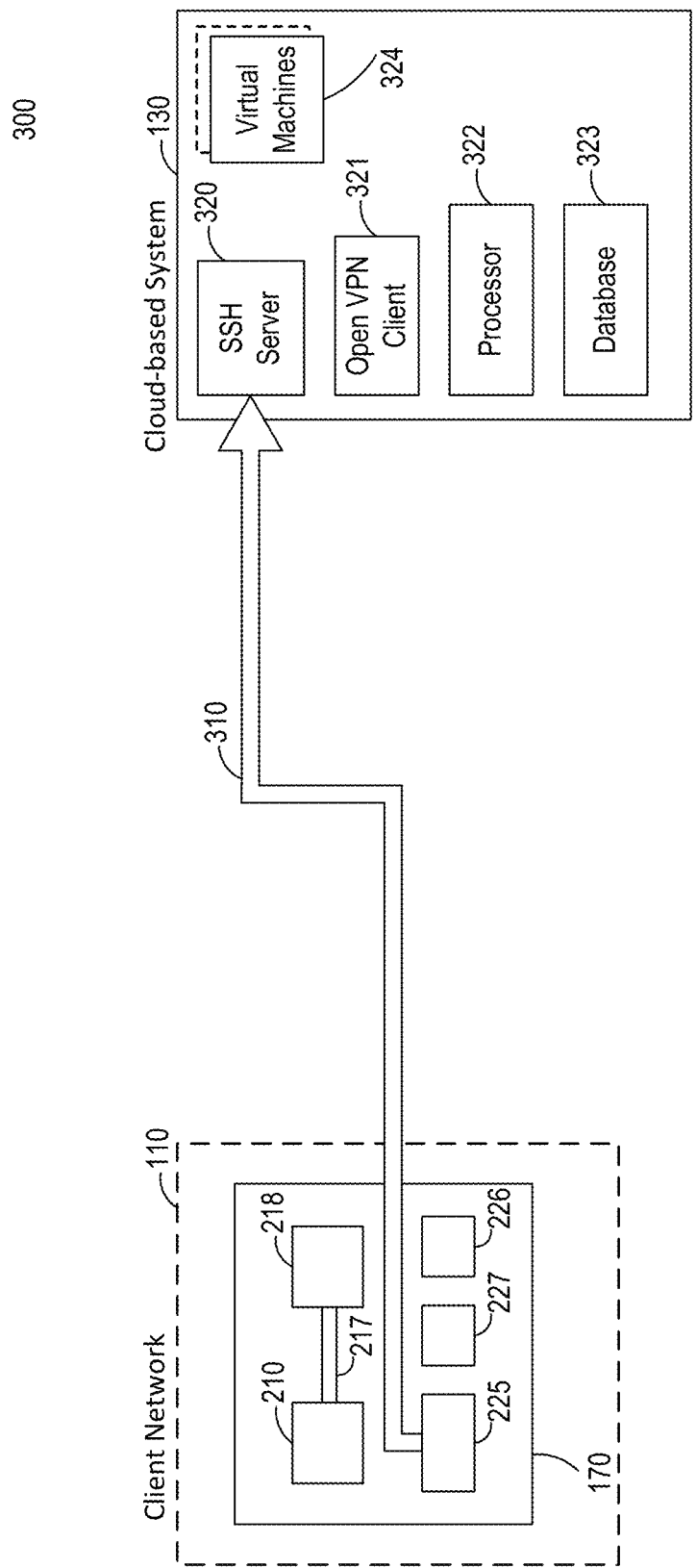
FIG. 3 is a block diagram depicting an exemplary process for initiating an external connection from a standalone e-discovery device in accordance with disclosed embodiments.

FIG. 3 depicts an exemplary process 300 for initiating an external connection from a standalone e-discovery device 170 in accordance with disclosed embodiments. FIG. 3 illustrates client site 110 and standalone e-discovery device 170, as described earlier in connection with FIGS. 1-2. FIG. 3 also illustrates a more detailed view of exemplary components of the cloud-based system 130. The cloud-based system 130 may include, for example, one or more support virtual machines 324, an SSH server 320, an Open VPN Client 321, processor 322, and database or memory 323. In accordance with various embodiments, processor (or processors) 322 may include one or more data or software processing devices. For example, the processor 322 may take the form of, but is not limited to, a microprocessor, embedded processor, or the like, or may be integrated in a system on a chip (SoC). Furthermore, according to some embodiments, the processor 322 may be from the family of processors manufactured by Intel®, AMO®, Qualcomm®, Apple®, NVIDIA®, or the like. The processor 322 may also be based on the ARM architecture, a mobile processor, or a graphics processing unit, etc. The disclosed embodiments are not limited to any particular type of processor configured in the cloud-based system 130. Database or memory 323 may include one or more storage devices configured to store instructions used by the processor 322 to perform functions related to the disclosed embodiments. Database or memory 323 may be configured to store software instructions, such as programs, that perform one or more operations when executed by the processor 322 to securely obtain data from, for example, the client site 110 or data support system 120.

When the one or more virtual machines 324 (e.g., virtual machine, DockerTM container, etc.) are provisioned based on a request for a support ticket, as described above, the standalone e-discovery device 170 may initiate an outgoing connection to the one or more virtual machines 324. This may be based on the information provided by the support service to the standalone e-discovery device 170, as described above. For example, this may be an SSH protocol connection where the SSH client 225 requests or establishes an SSH Tunnel 310 to the SSH server 320. Simultaneously, or in conjunction, this may create a reverse connection from the one or more virtual machines 324 to one or more host virtual machines $211_x$. The reverse connection may be a reverse tunnel that forwards a local port on the one or more virtual machines 324 to a port on the one or more host virtual machines $211_x$. For example, in an illustrative embodiment, the reverse connection may be between port 1194 of the one or more virtual machines 324 and port 1194 of the one or more host virtual machines $211_x$.

Once the reverse connection is established, the data support system 120 may use the reverse connection to remotely connect to the standalone e-discovery device 170. This may enable a support team member to initiate a VPN connection through the one or more virtual machines 324 over the SSH Tunnel 310 and directly to the private internal network 217. This action may create a connection between Open VPN client 321 and Open VPN server 226 to allow the support team member to provide support services to the users at client site 110 that initiated the request for support services. Support services may include, for example, remote diagnostics, administrative assistance, document processing or analysis tasks, or other support services. The digital certificate may be, for example, an SSL certificate, CSC certificate, client certificate, X.509 certificate, or the like.

Notably, in accordance with some embodiments, the e-discovery machine 170 may facilitate an external connection that limits the data support system 120's access to the client site 110. For example, access may be limited to only the e-discovery machine 170 itself (e.g., via the SSH tunnel 310), and not to other network resources at client site 110. In other embodiments, the access is limited to other defined or permitted components. Accessing the standalone e-discovery machine 170 may in some embodiments include the accessing system, e.g., data support system 120, to provide a certificate (e.g., digital certificate) that is unique to the standalone e-discovery machine 170.

Figure 4:
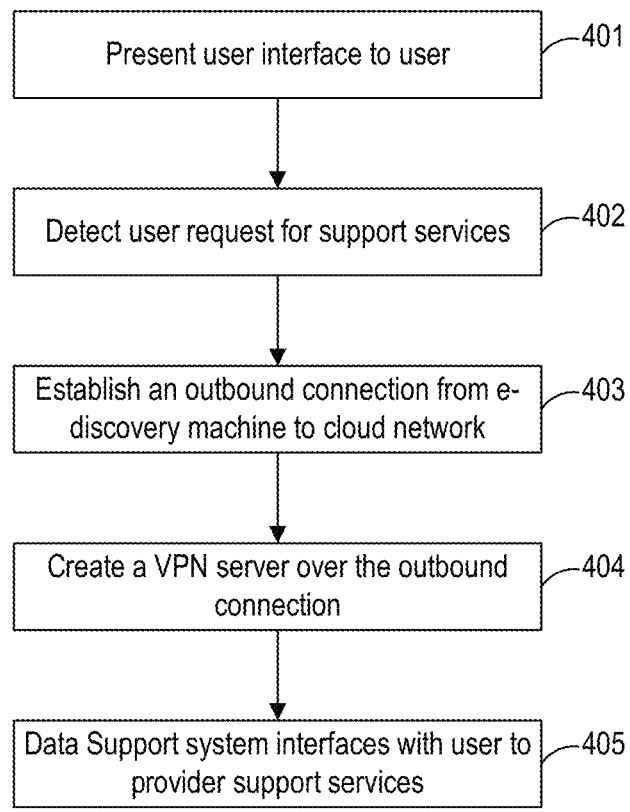
FIG. 4 is a flowchart depicting an exemplary process for initiating an external connection from a standalone e-discovery device in accordance with disclosed embodiments.

FIG. 4 is a flowchart depicting an exemplary process 400 for initiating an external connection from a standalone e-discovery device. Process 400 may be implemented, for example, by standalone e-discovery machine 170, as described in connection with FIG. 1. Process 400 may correspond to systems 100, 200, and 300 shown in FIGS. 1-3 and, accordingly, descriptions of the components and processes therein may apply to process 400 as well.

Figure 9:
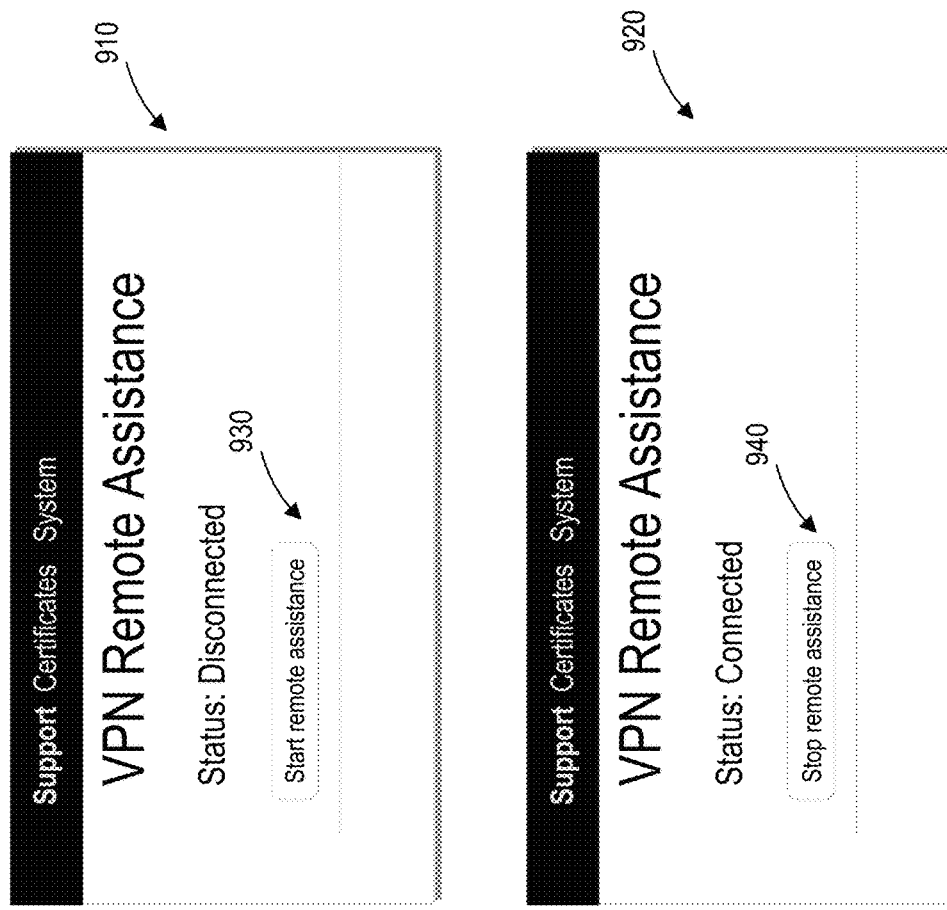
FIG. 9 is a diagram depicting an exemplary interface for a user to request remote assistance in accordance with disclosed embodiments.

At step 401, process 400 may include the standalone e-discovery machine 170 presenting a user interface to the user. This user interface may be presented by the software running on standalone e-discovery machine 170. In some embodiments, for example, the interface is based on HTML, Java, or other specifications, and may be rendered by a web browser (e.g., Internet Explorer™, Chrome™, Safari™, etc.). Alternatively, the interface may be generated through a proprietary application. As explained above, a user at a client site 110 may use the user interface to request support services. For example, FIG. 9 presents a graphical representation of an example of a user interface that a user may interact with to initiate a remote assistance request. Graphical representation 910 shows a user interface that indicates that remote assistance is disconnected and presents button 930 that permits a user to initiate a remote assistance request. Graphical representation 920 is similar and shows a user interface that indicates that remote assistance is connected. Button 940 correspondingly allows a user to stop remote assistance at any given time.

In FIG. 4, at step 402, process 400 may include the standalone e-discovery machine 170 detecting the user's request for support services. For example, a user at client site 110 may have interacted with a user interface and pressed button 930 to initiate a remote assistance request. Of course, other techniques for detecting a user's request for support services are possible as well. For example, the user could click a different support button, engage with the e-discovery software in a particular way (e.g., an erroneous or incorrect manner), etc., and those actions may be interpreted as requests for support services. Further, in some embodiments if a user is detected to enter a period of inactivity (e.g., after a predetermined time), or tries and fails to perform a particular action in the e-discovery software one or more times, that may be deemed a request for support services as well.

Figure 5:
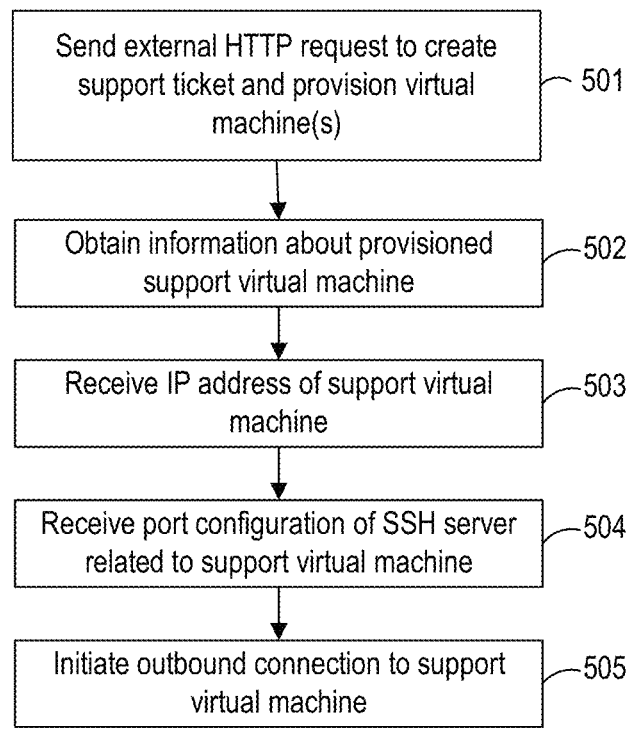
FIG. 5 is a flowchart depicting an exemplary process for establishing an outbound connection from a standalone e-discovery device in accordance with disclosed embodiments.

At step 403, process 400 may include the standalone e-discovery device 170 establishing an outbound connection from itself to a cloud network (e.g., cloud-based system 130). FIG. 5 provides further exemplary details on how standalone e-discovery device 170 may establish an outbound connection in exemplary embodiments. For example, at step 501, the standalone e-discovery device 170 may send an external HTTP request to create a support ticket (or another type of request, as discussed above) and provision one or more virtual machines. The request may be sent, for example, to the cloud-based system 130. Further, the virtual machines may be part of the cloud-based system 130, as described above. In some embodiments, the virtual machines (e.g., virtual machine instances, container instances, etc.) are not yet instantiated when the request is received. In such embodiments, the virtual machines may be dynamically spun up on demand based on the request.

At step 502, the standalone e-discovery device 170 may obtain information about the one or more provisioned support virtual machines (e.g., virtual machines 324). This information may include, for example, whether one or more virtual machines has been provisioned or instantiated. At step 503, the standalone e-discovery device 170 may receive an IP address, port number, or other network address information of the support virtual machine by, for example, the cloud-based system 130. At step 504, the standalone e-discovery device 170 may receive port configuration information of the virtual machine, which may act as an SSH server in the cloud-based system 130. At step 505, the standalone e-discovery device 170 can initiate an outbound connection to the support virtual machine. The outbound connection may be between SSH client 225 of the standalone e-discovery device 170 and the one or more support virtual machines (e.g., virtual machines 324) that act as an SSH server once they are provisioned.

At step 404, process 400 may include the standalone e-discovery device 170 creating and utilizing a VPN server over the outbound connection. For example, the VPN server may be created by the standalone e-discovery device 170 over the connection between the SSH client 225 and one or more support virtual machines 324. The VPN connection may be between an Open VPN client 321 of the cloud-based system 130 and Open VPN server 226 of the standalone e-discovery device 170. At step 405, process 400 may include the standalone e-discovery device 170 permitting one or more support team members access to the standalone e-discovery device 170 over the VPN connection to provide support services to the user at the client site 110. In this manner, the support services member may have secure (e.g., tunneled, encrypted, etc.) access to the standalone e-discovery machine 170 within the client site 110. Notably, even if the client site 110 is protected by a firewall, the VPN connection may be established in the above manner by the standalone e-discovery machine 170.

Figure 6:
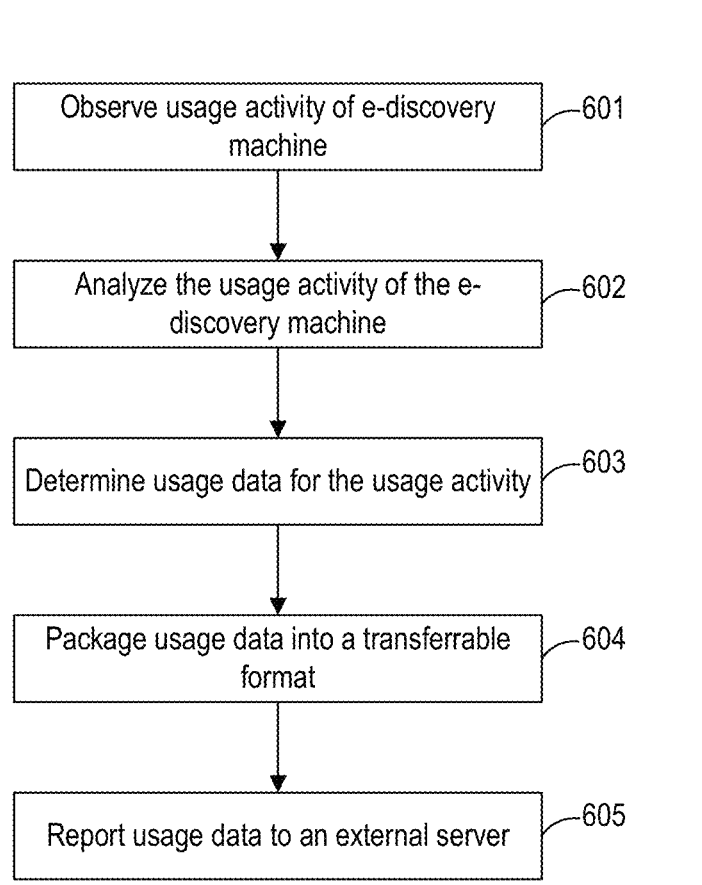
FIG. 6 is a flowchart depicting an exemplary process for a system to track usage of a standalone e-discovery machine in accordance with disclosed embodiments.

FIG. 6 is a flowchart depicting an exemplary process 600 for monitoring and reporting usage of standalone e-discovery machines 170. Process 600 may be executed on one or more standalone e-discovery machines 170, as described above, and may report data back to cloud-based system 130 and/or data support system 120.

At step 601, process 600 may include the standalone e-discovery machine 170 observing a user's usage activity of the standalone e-discovery machine 170. For example, standalone e-discovery machine 170 may observe the use of the e-discovery software that is stored on the standalone e-discovery machine 170 by one or more end users at client site 110. In some embodiments, this observation occurs in real-time, as the end users access documents, store documents, tag or classify documents, sort documents, filter documents, redact documents, convert or process documents, prepare documents for productions, etc. In some embodiments, the real-time reporting of such usage activity may be provided in reports. For example, such reports may indicate parameters such as a user (e.g., account or name) involved in the action, a time or date, a category of action or type of action, a number of documents involved, a file size or document size involved, etc. In further embodiments, rather than or in addition to real-time reports, such usage data may be created and periodically included in a report (e.g., daily, weekly, etc.) at standalone e-discovery machine 170.

At step 602, process 600 may include the standalone e-discovery machine 170 analyzing the usage activity that it observes. For example, a user's usage of e-discovery software (e.g., a particular document storage or processing application, or a particular software function, etc.) may be tracked according to one or more parameters. The analysis may be facilitated on the computer system 210 and 218, for example, using processor 213 and 221 to analyze and calculate different usage parameters and using memory 212 and 220 to continuously store and update usage information. In some embodiments, the analyzing of the usage activity occurs in real-time. Alternatively, as discussed above, the analysis may be performed periodically.

Figure 8:
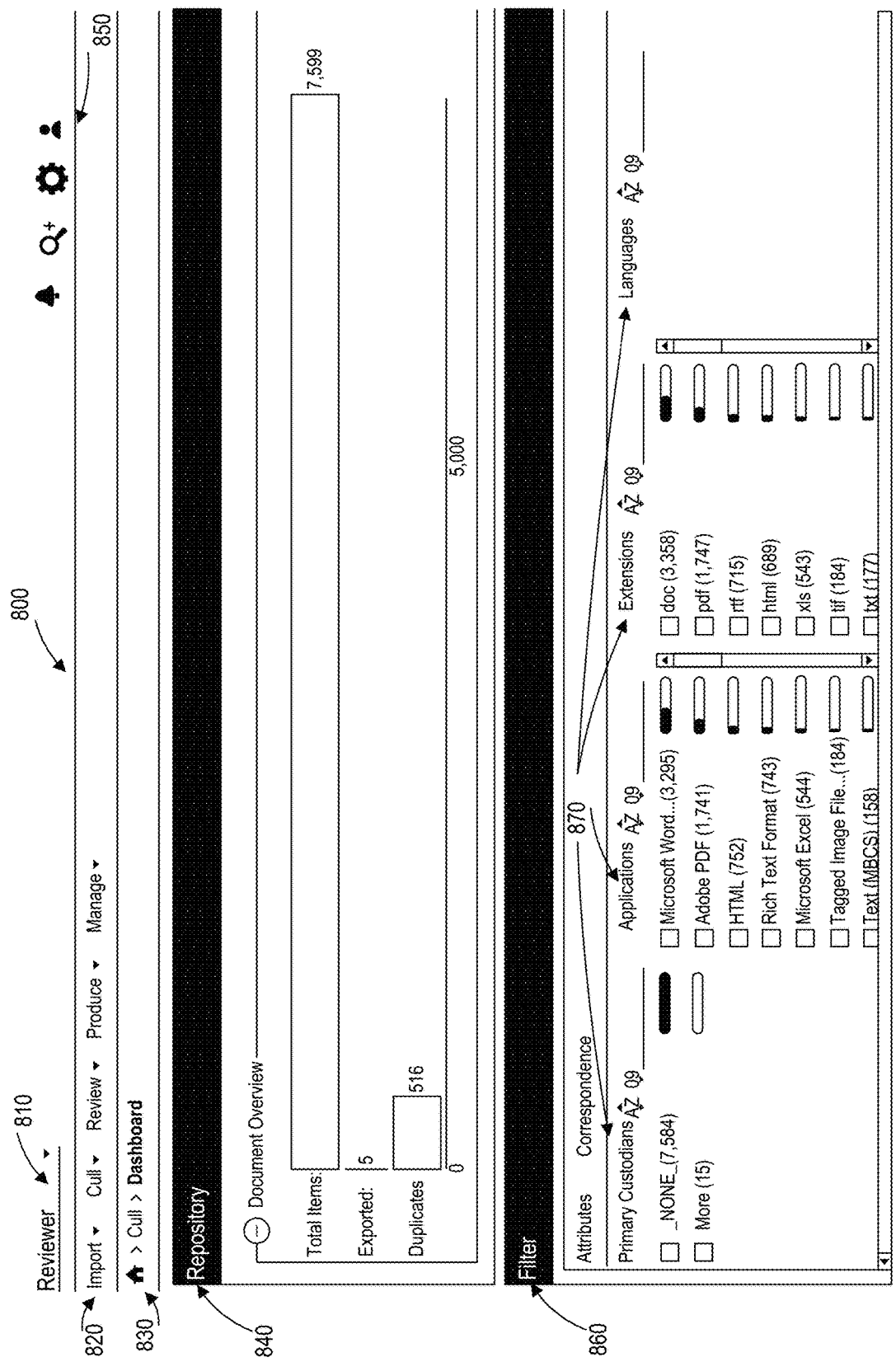
FIG. 8 is a diagram depicting an exemplary interface for a user using e-discovery software on a standalone e-discovery machine in accordance with disclosed embodiments.

In connection with operation 602, FIG. 8 depicts one embodiment of a user interface 800 for a user to access e-discovery software stored on the standalone e-discovery machine 170. FIG. 8 illustrates examples of what the standalone e-discovery machine 170 may observe and track as it relates to user activity. For example, object 810 may identify a user or a type of user using the e-discovery software. The type of user may vary, for example, as to different levels of reviewers (e.g., first reviewer, second reviewer, etc.) or different users (e.g., reviewer, administrator, etc.). Object 810 may also identify a specific user's name in some embodiments. Consistent with above embodiments, the standalone e-discovery machine 170 may observe and track usage on a per-user basis or across one or more users (e.g., across all users, or across all users of a certain type) based on a client's needs and preferences.

User interface 800 may have other objects that may be utilized and analyzed. For example, object 820 shows a task bar with various options a user may select from to perform various tasks. These tasks may include, for example, importing files, culling or filtering sets of data or files, reviewing certain data or files, producing certain data or files, managing certain data or files, redacting certain data or files, etc. Each of these tasks may lead to other options for tasks for the user to perform. For example, once data or documents have been de-duplicated or filtered, they may be converted or labeled in various ways.

Another instance of user interface 800 elements may include object 830. Object 830 may be a navigation task bar that helps the user jump from various pages or links within the e-discovery software. For example, the user may click the cull option on object 820, be presented with more options (e.g., sub-options), and then choose the dashboard option. Object 830 may show that the user navigated from the home screen, which may merely be an icon, to the cull option screen, and then to the dashboard screen. The user may be able to directly navigate back by clicking a page or link in object 830.

Another type of user interface 800 element may include object 840. Object 840 may be a repository field that shows document statistics. For example, object 840 may include a graphical breakdown of the total items (e.g., documents or data), exported items, and duplicate items within a set of documents. The repository may also represent other information about any information stored within the memories of the standalone e-discovery machine 170.

User interface 800 may also have other objects that may be observed and analyzed. For example, object 850 shows various icons that may allow a user to perform various tasks. As a further example, object 850 may be a task bar situated in the top right corner of the user interface 800 with icons that allow the user to check past or new notifications, search for various types of information, view and change settings of the e-discovery software, and view or change user profile information.

Another instance of user interface 800 objects may include object 860. For example, object 860 may allow a user to perform filtering tasks (e.g., keyword filtering, tag or code-based filtering, file type or size filtering, machine learning or AI-based filtering, predictive coding, de-duplication, etc.). For example, a user may be able to filter based on one or more of various fields 870. Some examples of fields may include custodian, document or application type, document or application extension, languages, file size, upload or creation date, etc. In other embodiments, other fields are contemplated based on the various data extracted and stored for each document or file.

Also in connection with step 602, FIG. 10 illustrates an exemplary user interface 1000 depicting capabilities of the e-discovery software stored in the standalone e-discovery machine 170. User interface 1000 depicts an import/export interface that allows users at the client site to locally import and export files. This is beneficial, for example, because users may not have to rely on using cloud services and/or a support team member external to the client site to perform such functions.

Returning to FIG. 6, at step 603 process 600 may include the standalone e-discovery machine 170 determining usage data based on the usage activity observed and calculated. For example, standalone e-discovery machine 170 may determine the amount of time one user of a plurality of users used the e-discovery software stored on the standalone e-discovery machine 170. Usage data can be based on a variety of parameters and adjusted based on a client's needs and how the client wishes to be charged for using third-party e-discovery software. As discussed above, usage data and usage reports may be created by the standalone e-discovery machine 170, upon detecting usage, or periodically (e.g., daily, weekly, monthly, etc.).

At step 604, process 600 may include the standalone e-discovery machine 170 packaging the usage data into a transferrable format. For example, the standalone e-discovery machine 170 may package the user data into a raw text file, HTML file, data object, LDAP directory file, email file, spreadsheet (e.g., Excel™, Google Sheets™), etc. The packaged data file may categorize or label the data according to types of data being recorded, time and/or date stamps, user or company identifiers, standalone e-discovery machine 170 identifiers (e.g., machine name, IP address), etc.

At step 605, process 600 may include the standalone e-discovery machine 170 reporting usage data to an external server. The external server may be part of the cloud-based system 130 or data support system 120. Notably, consistent with the above embodiments, the reporting of usage data may occur without changing the port configurations or the firewall of the local network at client site 110. Some embodiments, for example, contemplate reporting usage data using the VPN server that was described above.

Figure 7:
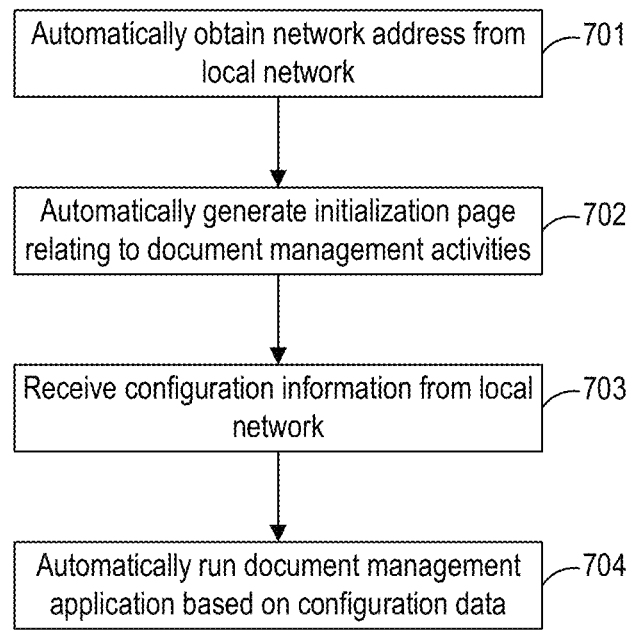
FIG. 7 is a flowchart depicting an exemplary process for automatically initializing a standalone e-discovery machine on a local network when the e-discovery machine is physically or wirelessly connected to the local network in accordance with disclosed embodiments.

FIG. 7 is a flowchart depicting an exemplary process 700 for initializing the standalone e-discovery machine 170 to operate on the client's private network. Consistent with the embodiments above, the client network 160 may be part of the client site 110, which may be protected by a firewall in some embodiments. Process 700 may be executed when the standalone e-discovery machine 170 initially makes a connection, wired or wirelessly, to the client's private network. One or more user workstation at the client site may be connected to the client's private network.

At step 701, process 700 may include the standalone e-discovery machine 170 automatically obtaining network address information from the client's private network. This may comprise, for example, the standalone e-discovery machine 170 implementing a DHCP or other protocol to obtain the network address. Consistent with above embodiments, the network address may be an IP address, MAC address, or other type of network address or identifier.

At step 702, process 700 may include standalone e-discovery machine 170 automatically generating an initialization page relating to the e-discovery or document management software installed on standalone e-discovery machine 170. For example, a user may see a user interface that allows them to use the e-discovery software stored on the standalone e-discovery machine 170.

At step 703, process 700 may include the standalone e-discovery machine 170 receiving configuration information from the client's private network. The configuration information, for example, may comprise of configuration code(s) relating to some settings of the standalone e-discovery machine 170 or settings of the client's private network. Further, the confirmation information may include network settings (e.g., open ports, firewall settings, etc.) that enable the standalone e-discovery machine 170 to communicate outside of client site 110.

At step 704, process 700 may include the standalone e-discovery machine 170 automatically running the e-discovery software or document management application based on the received configuration data. For example, this may include executing the document management or processing software stored locally on the standalone e-discovery machine 170.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for tracking usage of a standalone e-discovery machine that includes e-discovery software comprising:
    observing usage activity of at least one user of the standalone e-discovery machine;
    analyzing the usage activity of the at least one user in terms of at least one parameter, wherein the at least one parameter comprises of at least one of: size of data processed, number of users using the e-discovery machine, health metrics, or activities performed;
    wherein the observing and analyzing the usage activity involves processing e-discovery data;
    based on the e-discovery data processed during the observing and analyzing the usage activity, determining usage data for the at least one user;
    packaging the usage data into a transferrable format for secure communication to an external server; and
    reporting the usage data over a secure network connection from a host network to the external server;
    wherein the standalone e-discovery machine is configured to allow the at least one user to perform e-discovery operations using the standalone e-discovery machine in a network environment of the at least one user.

2. The computer-implemented method of claim 1, wherein the observing usage activity of at least one user comprises observing the at least one user's usage of the e-discovery software stored on the e-discovery machine.

3. The computer-implemented method of claim 1, wherein the tracking usage of the standalone e-discovery machine occurs in real-time.

4. The computer-implemented method of claim 1, wherein the packaging the usage data into the transferrable format comprises packaging the usage data into at least one of: a raw text file, an HTML file, or a data object.

5. The computer-implemented method of claim 1, wherein the reporting the usage data comprises not changing network firewall settings of the network environment of the at least one user, wherein the network environment of the at least one user is a local network to which the e-discovery machine is connected.

6. The computer-implemented method of claim 1, wherein the reporting the usage data comprises not changing port configurations of the network environment of the at least one user, wherein the network environment of the at least one user is a local network to which the e-discovery machine is connected.

7. The computer-implemented method of claim 1, wherein the reporting the usage data comprises not changing network firewall or port configurations of the network environment of the at least one user, wherein the network environment of the at least one user is a local network to which the e-discovery machine is connected.

8. The computer-implemented method of claim 1, wherein the standalone e-discovery machine is integrated into a local network that at least one computer of the at least one user is remotely connected to, wherein the integration into the local network comprises the e-discovery machine being physically connected to the local network.

9. The computer-implemented method of claim 1, wherein the standalone e-discovery machine is integrated into a local network that at least one computer of the at least one user is remotely connected to, wherein the integration into the local network comprises the e-discovery machine being wirelessly connected to the local network.

10. A standalone e-discovery apparatus that includes e-discovery software for which usage can be tracked comprising:
    a processor configured to execute software instructions; and
    a memory storing the software instructions;
    wherein the processor is configured to execute the software instructions to perform operations comprising:
    observing usage activity of at least one user of the standalone e-discovery machine;
    analyzing the usage activity of the at least one user in terms of at least one parameter, wherein the at least one parameter comprises of at least one of: size of data processed, number of users using the e-discovery machine, health metrics, or activities performed;
    wherein the observing and analyzing the usage activity involves processing e-discovery data;
    based on the e-discovery data processed during the observing and analyzing the usage activity, determining usage data for the at least one user;
    packaging the usage data into a transferrable format for secure communication to an external server; and
    reporting the usage data over a secure network connection from a host network to the external server;
    wherein the standalone e-discovery machine is configured to allow the at least one user to perform e-discovery operations using the standalone e-discovery machine in a network environment of the at least one user.

11. The standalone e-discovery apparatus of claim 10, wherein the observing usage activity of at least one user comprises observing the at least one user's usage of the e-discovery software stored on the e-discovery machine.

12. The standalone e-discovery apparatus of claim 10, wherein the tracking usage of the standalone e-discovery machine occurs in real-time.

13. The standalone e-discovery apparatus of claim 10, wherein the packaging the usage data into the transferrable format comprises packaging the usage data into at least one of: a raw text file, an HTML file, or a data object.

14. The standalone e-discovery apparatus of claim 10, wherein the reporting the usage data comprises not changing network firewall settings of the network environment of the at least one user, wherein the network environment of the at least one user is a local network to which the e-discovery machine is connected.

15. The standalone e-discovery apparatus of claim 10, wherein the reporting the usage data comprises not changing port configurations of the network environment of the at least one user, wherein the network environment of the at least one user is a local network to which the e-discovery machine is connected.

16. The standalone e-discovery apparatus of claim 10, wherein the reporting the usage data comprises not changing network firewall or port configurations of the network environment of the at least one user, wherein the network environment of the at least one user is a local network to which the e-discovery machine is connected.

17. The standalone e-discovery apparatus of claim 10, wherein the standalone e-discovery machine is integrated into a local network that at least one computer of the at least one user is remotely connected to, wherein the integration into the local network comprises the e-discovery machine being physically connected to the local network.

18. The standalone e-discovery apparatus of claim 10, wherein the standalone e-discovery machine is integrated into a local network that at least one computer of the at least one user is remotely connected to, wherein the integration into the local network comprises the e-discovery machine being wirelessly connected to the local network.

* * * * *